Figure 1:
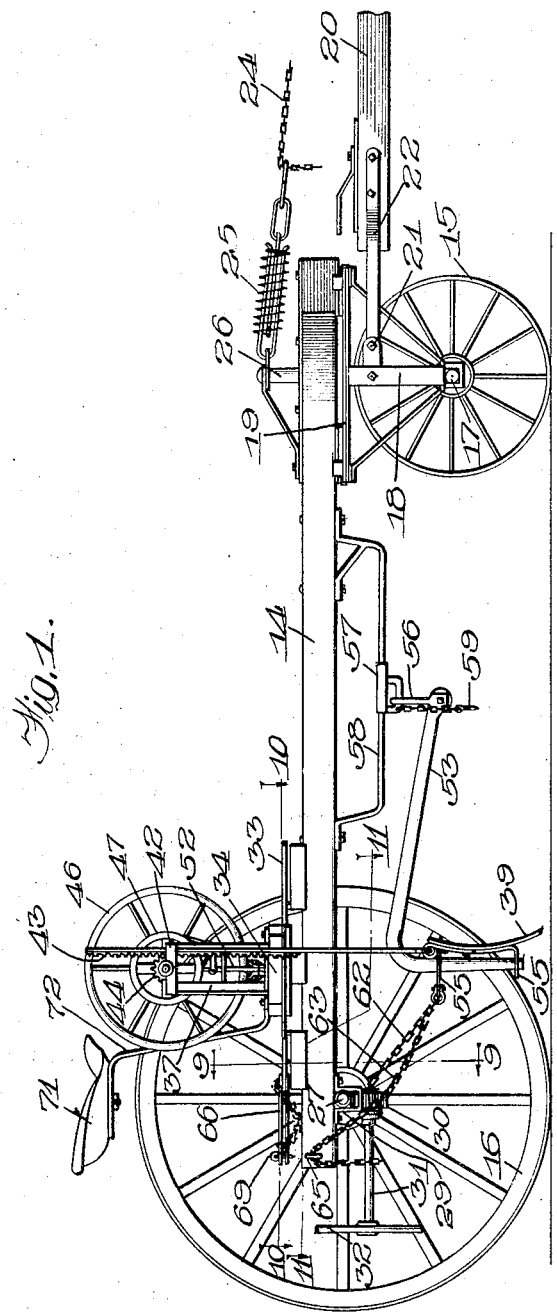

No. 894,281.

PATENTED JULY 28, 1908.

T. R. McKNIGHT.
ROAD MACHINE.
APPLICATION FILED APR. 3, 1908.

5 SHEETS—SHEET 3.

Witnesses:

Inventor
Thomas R. McKnight,

No. 894,281. PATENTED JULY 28, 1908.
T. R. McKNIGHT.
ROAD MACHINE.
APPLICATION FILED APR. 3, 1908.

5 SHEETS—SHEET 4.

Witnesses:

Inventor:
Thomas R. McKnight,
by his Attys.

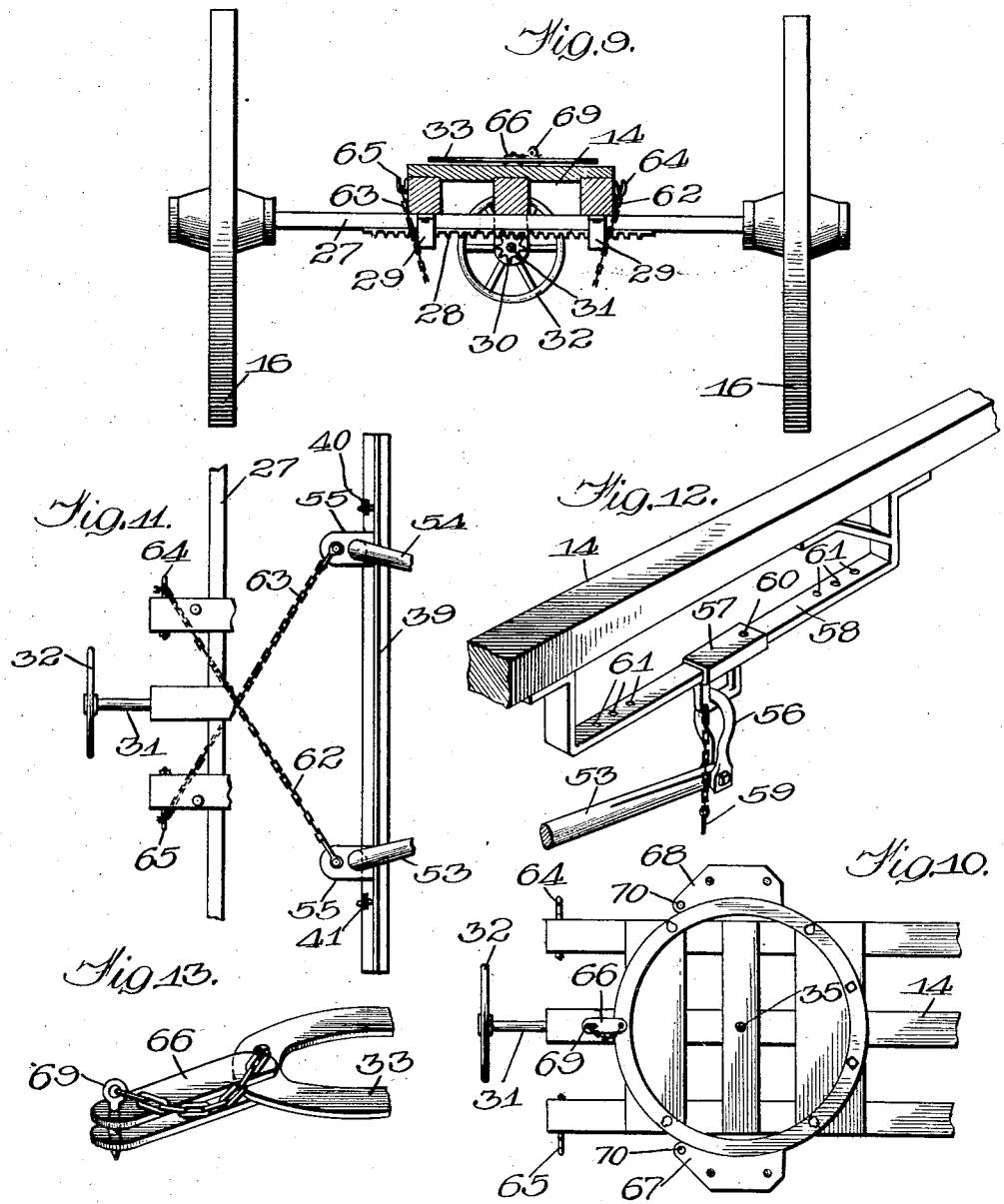

UNITED STATES PATENT OFFICE.

THOMAS R. McKNIGHT, OF AURORA, ILLINOIS, ASSIGNOR TO WESTERN WHEELED SCRAPER COMPANY, OF AURORA, ILLINOIS, A CORPORATION OF ILLINOIS.

ROAD-MACHINE.

No. 894,281.     Specification of Letters Patent.     Patented July 28, 1908.

Application filed April 3, 1908. Serial No. 424,926.

*To all whom it may concern:*

Be it known that I, THOMAS R. McKNIGHT, a citizen of the United States, residing at Aurora, in the county of Kane and State of Illinois, have invented certain new and useful Improvements in Road - Machines, of which the following is a specification, reference being had to the accompanying drawings.
My invention relates to machines for making and repairing roads, and has for its object to provide a new and improved machine suitable for grading, ditching and leveling, in which the various adjustments of the scraper-blade may be easily and quickly made, and in which the machine as a whole will be simple and economical of construction and operation.

It consists in the improved combinations and arrangements hereinafter described and illustrated in the drawings.

Figure 2:
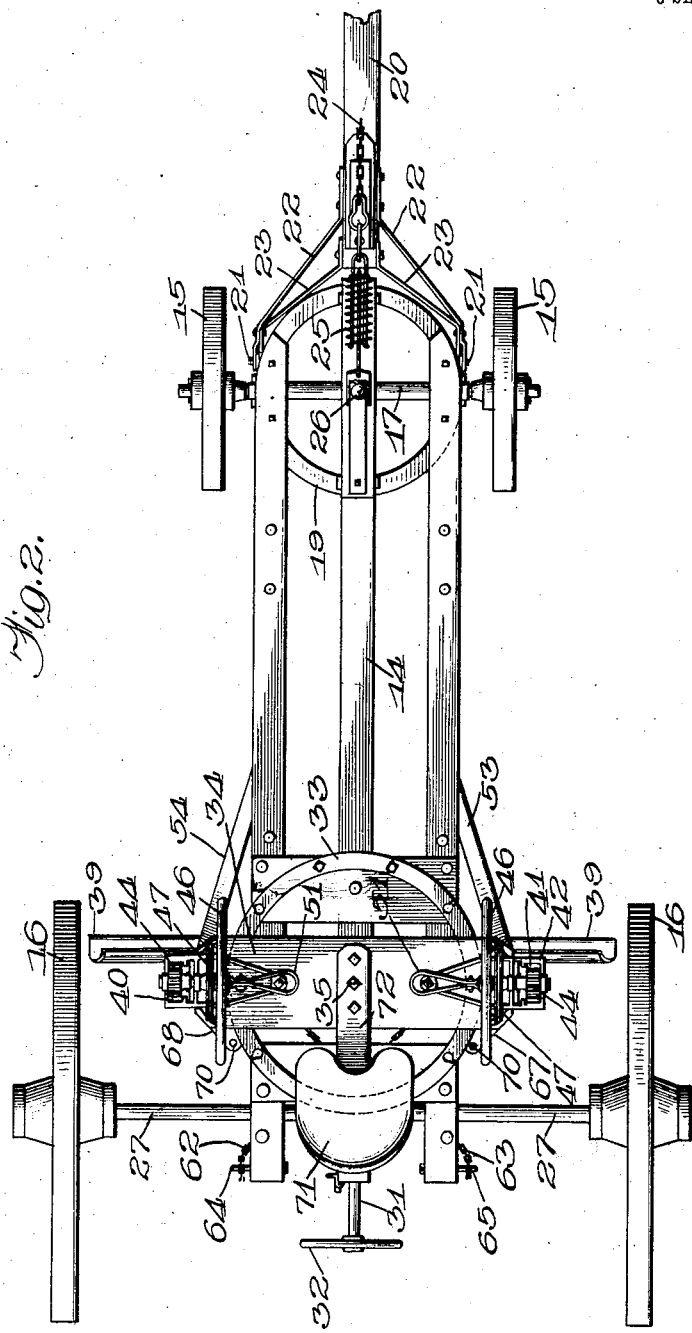
Figure 3:
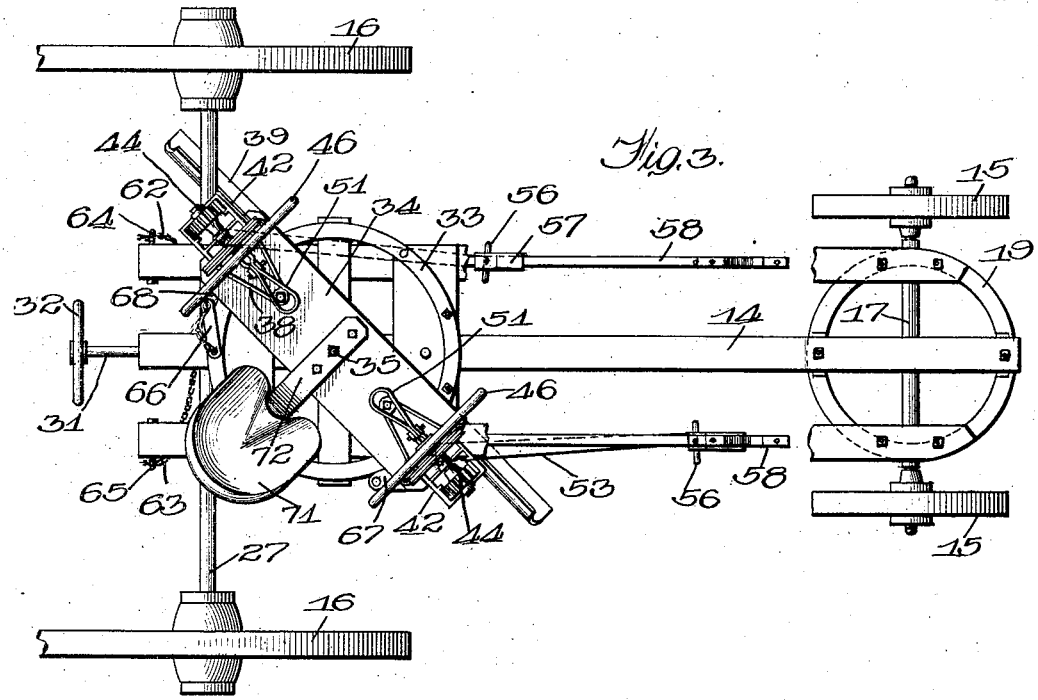
Figure 4:
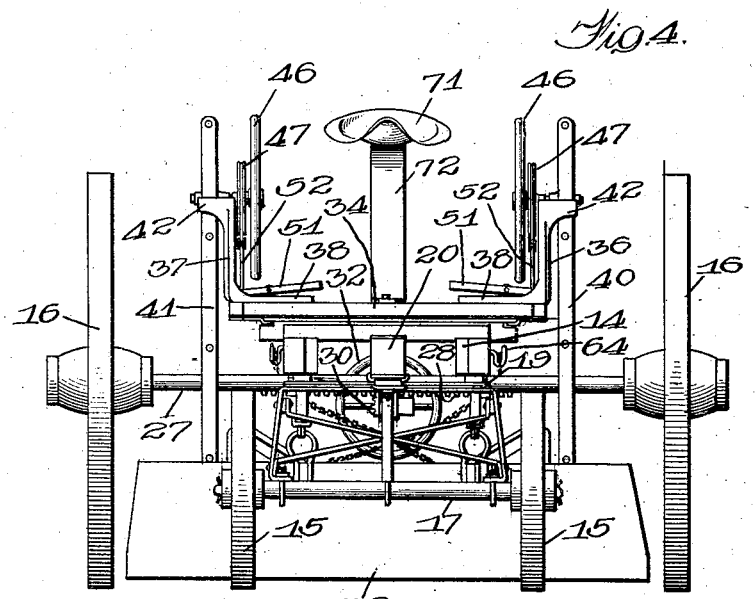
Figure 6:
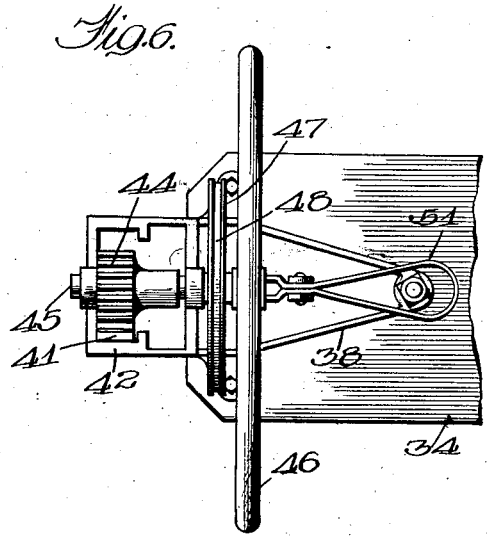
Figure 5:
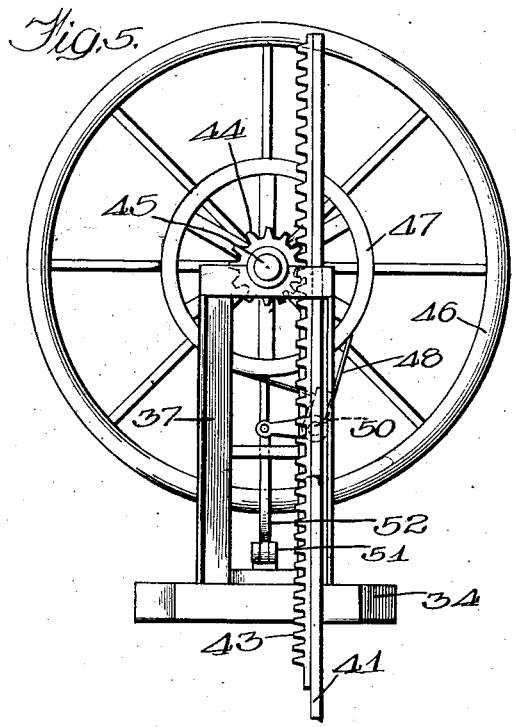
Figure 7:
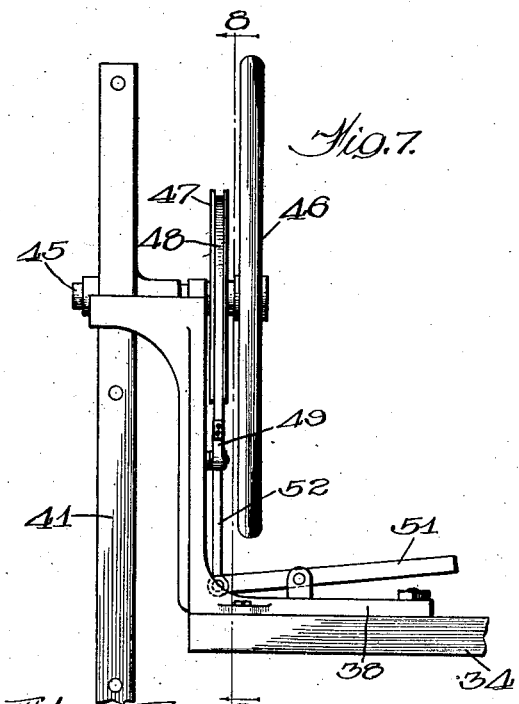
Figure 8:
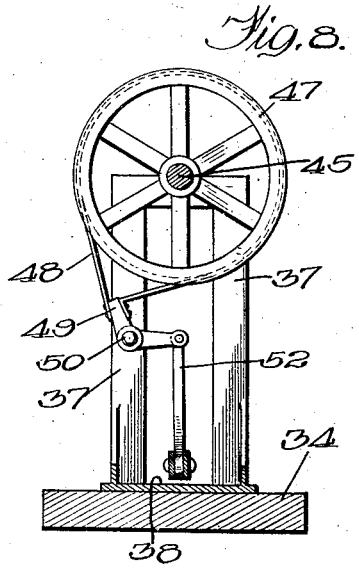

In the drawings,—Figure 1 is a side elevation of my improved machine; Fig. 2 is a plan view; Fig. 3 is also a plan view, showing a changed position of the scraper-blade and connected parts, some parts of the frame being broken away; Fig. 4 is a front end elevation; Fig. 5 is a side elevation of the hand-wheel and connected parts for vertically adjusting the scraper-blade; Fig. 6 is a plan view of the parts shown in Fig. 5; Fig. 7 is an end view of said parts; Fig. 8 is a view taken on line 8—8 of Fig. 7, showing the hand-wheel brake mechanism; Fig. 9 is a vertical section on line 9—9 of Fig. 1; Fig. 10 is a horizontal section on line 10—10 of Fig. 1; Fig. 11 is a section on line 11—11 of Fig. 1; Fig. 12 is a perspective view, showing one of the connections for the front end of one of the scraper beams; and Fig. 13 is a perspective view, showing the connections by which the turntable elevating mechanism is secured in its different positions of adjustment.
Referring to the drawings,—14 indicates the main frame of the machine, which is mounted on front wheels 15 and rear wheels 16. The front wheels are carried by an axle 17 which supports a bolster 18 connected to a fifth wheel 19 in the usual way.

20 indicates the tongue, which is pivotally connected with the bolster 18, as shown at 21 in Fig. 1, so that its front end may rise and fall. The tongue cannot, however, move laterally as it is connected with the bolster by diverging braces 22—23 at each side, as shown in Fig. 2. The front end of the tongue is supported by a chain 24 connected at its rear end through a spring 25 with a post 26 secured at the front portion of the frame of the machine, as shown in Fig. 1.

The rear wheels are mounted on the ends of an axle 27, best shown in Fig. 9, said axle having a rack 28 on its under side. The frame 14 rests upon the axle and is connected thereto by clips 29 which embrace the axle, as shown in Fig. 9. The frame 14 may be shifted longitudinally of the axle by means of a pinion 30 which engages the rack 28, said pinion being mounted on a shaft 31 rotated by a hand-wheel 32, as shown in Figs. 1 and 9. Said shaft 31 projects rearwardly so that the hand-wheel is at the back of the machine, as shown in Figs. 1 and 2. Thus the frame of the machine may be shifted to one side or the other to move the scraper-blade toward or from either side of the road.

33 indicates a flat ring or annular track secured upon the frame 14 near the rear end portion thereof, as shown in Figs. 1, 2 and 10. Said ring is fixedly secured to the frame and serves to provide a bearing for a rotating plate or platform 34, which is pivoted centrally of the track 33 on a pivot 35, best shown in Fig. 2, and the arrangement is such that the plate 34 may swing about its pivot 35 into different angular positions relatively to the frame, as shown in Fig. 3.

36—37 indicate standards secured to the ends of the plate 34, as shown in Fig. 4. Said standards are provided with bases 38 which are fixedly secured to the ends of said plate, as shown in Fig. 4, and serve also to support certain other parts of the apparatus, as will be hereinafter described.

39 indicates the scraper-blade, which is of the usual shape and is pivotally connected with the lower ends of upright bars 40—41, best shown in Fig. 4. Said bars are pivotally connected with the scraper-blade near its ends and extend upward, passing through brackets 42 carried by the standards 36—37, as best shown in Figs. 5, 6 and 7. The bars 40—41 are provided with racks 43 on one side, as shown in Fig. 5, which racks are engaged by pinions 44 mounted on shafts 45, which are suitably supported by the standards 36—37, respectively, as shown in Figs. 5 to 7. Hand-wheels 46 are provided for rotating said shafts. The arrangement is such that by rotating the hand-wheels the bars 40—41 may be raised or lowered to raise or lower either or both ends of the scraper-blade. This elevating mechanism is duplicated at each side of the machine, so that either end of the scraper-blade may be adjusted, as desired.

Adjacent to each hand-wheel 46 is a brake-wheel 47 also mounted on a shaft 45 and provided with a brake-band 48 connected to a bell-crank lever 49 mounted on a pivot or fulcrum 50 secured to the adjacent standard, as shown in Fig. 8. A foot-lever 51 is fulcrumed upon the standard base 38 and connected with the bell-crank lever by a connecting-rod 52, as shown in Fig. 7, so that by depressing the foot-lever the brake may be applied to the brake-wheel. Thus either elevating bar may be locked at the desired height.

As shown in Fig. 2, the scraper-blade is provided near its ends with beams 53—54 which are pivotally connected with the scraper, preferably by being fitted in suitable sockets in rearwardly-projecting ears 55, shown in Figs. 1 and 11. The forward ends of the beams 53—54 are connected by links 56 with sliding-blocks 57 mounted on guides 58 secured to the under side of the side portions of the main frame, as shown in Figs. 1 and 12. As therein shown, the sliding-blocks 57 are arranged to be moved longitudinally of the guides 58 and may be secured in different positions of adjustment by means of a pin 59 passing through a hole 60 in the block and corresponding holes 61 at different points on the guides 58, as shown in Fig. 7. The blocks 57 serve as a means of connecting the beams 53—54 to the frame of the machine, whatever the angular adjustment of the scraper-blade may be. In addition to the front connections for holding the scraper-blade in its different positions of adjustment, rear connections also are provided consisting of chains 62—63 which are connected to the upper ears 55 and extend diagonally to the rear so that they are crossed, as shown in Fig. 11, their rear ends being secured by hooks 64—65, respectively, as also shown in Figs. 9 and 11. The chains 62—63 coöperate with the beams to hold the scraper-blade in its proper operative position, whatever may be its position of adjustment, and prevent its lateral displacement.

The rotary plate 34 is secured in its different positions of adjustment by means of links 66 which are pivotally connected to the circular track 33, as shown in Fig. 13, and are adapted to be connected to either of two blocks 67—68 at the under side of the platform near its opposite ends, as shown in Figs. 3 and 10. Said links are connected to the blocks 67—68 by a pin 69 which passes through suitable holes in the outer ends of the links and also through holes 70 in the blocks 67—68, as shown in Figs. 3 and 10.

71 indicates a seat, which is mounted on a seat-support 72 secured to the plate 34, as shown in Figs. 1 and 3, so that the seat turns with the plate.

From the foregoing description, it will be seen that with the machine described the scraper-blade may be readily adjusted to any desired angular position and may also be adjusted laterally toward either side of the machine, and that whatever its position provision is made for securing it at all times in position; and, moreover, the various parts are simple in construction and may readily be removed and replaced when necessary.

That which I claim as my invention, and desire to secure by Letters Patent, is,—

1. In a road-machine, the combination of a wheeled frame, a scraper-blade, beams connected with the end portions of the scraper-blade and extending forward therefrom, and connecting devices adjustable longitudinally of the frame for connecting the front ends of the beams therewith.

2. In a road-machine, the combination of a wheeled frame, a scraper-blade, beams connected with the end portions of the scraper-blade and extending forward therefrom, guides at the sides of the frame, and connecting devices connected with said beams and adjustably connected with said guides.

3. In a road-machine, the combination of a wheeled frame, a scraper-blade, beams connected with the end portions of the scraper-blade and extending forward therefrom, connecting devices adjustable longitudinally of the frame for connecting the front ends of the beams therewith, and means carried by the machine frame for vertically adjusting the scraper-blade.

4. In a road-machine, the combination of a wheeled frame, a scraper-blade, beams connected with the end portions of the scraper-blade and extending forward therefrom, connecting devices adjustable longitudinally of the frame for connecting the front ends of the beams therewith, and devices at the sides of the machine frame and connected with the end portions of the scraper-blade for vertically adjusting the same.

5. In a road-machine, the combination of a wheeled frame, a scraper-blade, beams connected with the end portions of the scraper-blade and extending forward therefrom, connecting devices adjustable longitudinally of the frame for connecting the front ends of the beams therewith, and devices mounted on the machine frame and connected with the scraper-blade for elevating the same, said elevating devices being angularly adjustable relatively to the line of draft.

6. In a road-machine, the combination of a wheeled frame, a scraper-blade arranged thereunder, elevating devices mounted on the machine frame and angularly adjustable about a vertical axis, means connecting said elevating devices with the scraper-blade, and means extending forward from the scraper-blade and connecting the same with the machine frame.

7. In a road-machine, the combination of a wheeled frame, a scraper-blade arranged thereunder, a plate mounted on the machine frame and movable about a vertical axis, and elevating devices carried by said plate near the ends thereof and connected with the end portions of the scraper-blade.

8. In a road-machine, the combination of a wheeled frame, a scraper-blade arranged thereunder, a plate mounted on the machine frame and movable about a vertical axis, elevating devices carried by said plate near the ends thereof and connected with the end portions of the scraper-blade, and means for locking said plate in its different positions of adjustment.

9. In a road-machine, the combination of a wheeled frame, a scraper-blade arranged thereunder, means extending forward from the scraper-blade and connecting said scraper-blade with the machine frame, and flexible devices connecting the end portions of the scraper-blade with the machine frame for holding the scraper-blade against lateral movement.

10. In a road-machine, the combination of a wheeled frame, a scraper-blade arranged thereunder, beams extending forward from the scraper-blade and connecting said scraper-blade with the machine frame, and flexible devices connecting the end portions of the scraper-blade with the machine frame for holding the scraper-blade against lateral movement.

11. In a road-machine, the combination of a frame, wheels supporting the forward portion of the frame, a rear axle, wheels mounted thereon, means for moving the frame laterally upon the rear axle, a scraper-blade, beams connected with the end portions of the scraper-blade and extending forward therefrom, and connecting devices adjustable longitudinally of the frame for connecting the front ends of the beams therewith.

12. In a road-machine, the combination of a frame, wheels supporting the forward portion of the frame, a rear axle, wheels mounted thereon, means for moving the frame laterally upon the rear axle, a scraper-blade, elevating devices mounted on the machine frame and angularly adjustable about a vertical axis, means connecting said elevating devices with the scraper-blade, and means extending forward from the scraper-blade and connecting the same with the machine frame.

13. In a road-machine, the combination of a frame, wheels supporting the forward portion of the frame, a rear axle, wheels mounted thereon, means for moving the frame laterally upon the rear axle, a scraper-blade, means extending forward from the scraper-blade for connecting the same with the machine frame, and flexible devices connecting the end portions of the scraper-blade with the machine frame for holding said blade against lateral movement.

14. In a road-machine, the combination of a frame, wheels supporting the forward portion of the frame, a rear axle, wheels mounted thereon, means for moving the frame laterally upon the rear axle, a scraper-blade, means extending forward from the scraper-blade for connecting the same with the machine frame, flexible devices connecting the end portions of the scraper-blade with the machine frame for holding said blade against lateral movement, and elevating devices mounted on the machine frame and angularly adjustable about a vertical axis, said elevating devices being connected with the end portions of the scraper-blade.

THOMAS R. McKNIGHT.

Witnesses:
WM. D. FOULKE,
M. C. ATWOOD.